Figure 1:
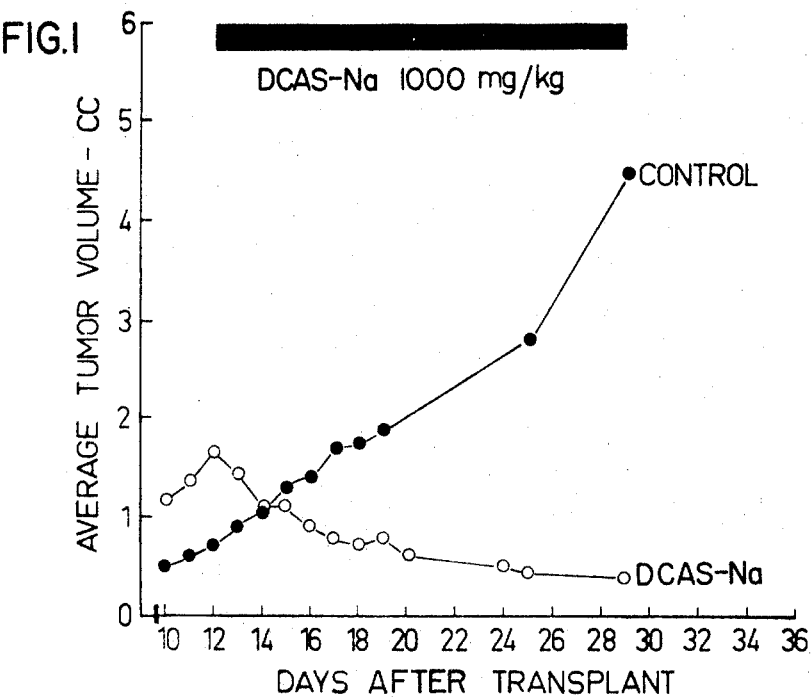

March 4, 1969 I. LEVI ET AL 3,431,299

SODIUM SALT OF N-DICHLOROACETYL-DL-SERINE

Filed Feb. 17, 1961

INVENTORS
Irving LEVI
Harold BLONDAL

BY Cushman, Darby & Cushman
ATTORNEYS

3,431,299
SODIUM SALT OF N-DICHLOROACETYL-DL-SERINE

Irving Levi, Montreal, Quebec, and Harold Blondal, Westmount, Quebec, Canada, assignors to Charles E. Frosst & Co., Montreal, Quebec, Canada, a corporation of Quebec
Continuation-in-part of applications Ser. No. 845,598, Oct. 12, 1959, and Ser. No. 18,885, Mar. 13, 1960. This application Feb. 17, 1961, Ser. No. 90,048
U.S. Cl. 260—534          1 Claim
Int. Cl. C07c *103/50;* A61k *27/00*

This application is a continuation-in-part application of applications Ser. Nos. 845,598 and 18,885 filed on Oct. 12, 1959, and Mar. 13, 1960, respectively, both abandoned, in the names of I. Levi and H. Blondal, inventors.

The present invention relates to compositions and new compounds useful in causing substantial regression of certain tumors and to a method of employing said compositions and new compounds in the treatment of tumors in animals.

There has existed a need for a composition which will differentially cause a destructive action on tumor cells while at the same time having comparatively little or no effect on normal cells. In the past, many nitrogen mustards have been used in the treatment of many types of tumors. Although many have been found effective, most have not been found satisfactory because of undesirable and severe side effects.

It has now been found that certain N-haloacetyl derivatives of DL-serine when associated with a carrier, which may be either a solid material or a sterile parenteral liquid, are useful in the treatment of tumors.

The N-haloacetyl derivatives of DL-serine which are useful in the compositions of the present invention having the formula:

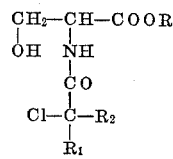

wherein R stands for an alkali metal salt and methyl or ethyl radicals, $R_1$ stands for chlorine or hydrogen, and $R_2$ stands for chlorine or hydrogen.

Also in accordance with the present invention it has been found that compositions comprising N-haloacetyl derivatives of DL-serine of the formula:

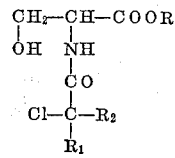

and a carrier, which may be either a solid material or a sterile parenteral liquid are useful in the treatment of various tumors.

The compositions of the present invention may take the form of tablets, powders, capsules or other dosage forms useful for oral ingestion. Liquid diluents in sterile condition may be used for parenteral use, for example, by intravenous injections. In the dry form, solid diluents such as corn starch, calcium citrate, guargum and magnesium stearate and the like may be used. A capsule of resorbable material, such as gelatine, may also be employed. The compositions may be used in solution in sterile water or as 5% solution in normal saline medium.

The compositions of the present invention are capable by themselves of causing regression in animal tumors such as sarcoma-37 in mice.

The compositions were tested in animals in accordance with the following procedure:

White male mice, weighing 25–30 grams, from the Connaught Laboratories, Toronto, Ontario, Canada, were used as hosts for sarcoma-37 tumors. The animals were caged in small groups of 5 or 6, fed water and biscuits of complete animal feedstuff ad libitum.

The tumors were transplanted under conditions of "clean" technique, care being taken to avoid contamination. Fresh tumor slices, free from necrotic areas were macerated with scalpel and scissors in sterile petri dishes. When tumor fragments were small enough to pass a #18 hypodermic needle, they were transplanted subcutaneously under the skin on the backs of the animals, midway between the head and the root of the tail. It will be noted that the sarcoma-37 was grown in the solid form in the animals. The sarcoma-37 tumor was allowed to grow to about 1.0–1.5 cc. in volume before testing was begun. The tumor volumes were estimated by caliper measurement, the product of the length, width, and thickness being considered the volume of the tumor.

The sodium salt of N-dichloroacetyl-DL-serine was dissolved in sterile water and in most experiments, injected intraperitoneally. In one mouse experiment, the sodium salt of N-dichloroacetyl-DL-serine was administered orally via a blunted hypodermic needle. The animals were treated and the tumors measured daily except for occasional week-ends.

Table I shows the effect of the sodium salt of N-dichloroacetyl-DL-serine (DCAS-Na) on the survival of sarcoma-37 in mice.

TABLE I

| | Treatment | No. of animals | Dose, Mg./kg. | No. of complete regressions | Percent regression |
|---|---|---|---|---|---|
| 1 Control | Untreated | 40 | | [1] 2 | 5 |
| 2 Control | DL-serine | 10 | 1,000 | 0 | 0 |
| 3 Test | DCAS-Na (i.p.) | 10 | 400 | 0 | 0 |
| 4 Test | DCAS-Na (i.p.) | 24 | 750 | 8 | 33 |
| 5 Test | DCAS-Na (i.p.) | 19 | 1,000 | 12 | 63 |
| 6 Test | DCAS-Na (oral) | 9 | 1,000 | 5 | 55 |

[1] Spontaneous.

There were two spontaneous regressions in the 40 animals making up the untreated control group 1. The unaltered amino acid, serine, showed no antitumor effect in group 2. Animals treated with doses of 750 mg. and 1000 mg. per kilogram of body weight, groups 4 and 5, showed 33% and 66% regressions respectively. The animals in group 3 receiving 400 mg. per kilogram of body weight, showed no regressions. The sodium salt of N-dichloroacetyl-DL-serine administered orally was also effective (group 6) with 55% of the tumors completely regressing.

FIG. 1 shows the effect of 1000 mg. per kilogram of body weight of the sodium salt of N-dichloroacetyl-DL-serine on the growth of sarcoma-37. Each group contained 10 animals. There was an immediate response of the tumors to the compound. Measurements on the third treatment day showed that the tumors lost approximately ⅓ of their volume. As they decreased in size, these tumors became very hard, and those that completely regressed, sloughed off, leaving an ulcer which eventually healed.

Pharmacological properties

The sodium salt of N-dichloroacetyl-DL-serine is a white crystalline compound soluble to the extent of about 15% in water at room temperature. In acute toxicity studies in mice it was previously reported (1) that the $LD_{50}$ was in excess of 4 grams per kilogram of body weight. It has now been demonstrated that the $LD_{50}$ value lies somewhere between 15 and 20 grams per kilogram of body weight. Infusion of a cat with 7 grams per kilogram of body weight over a period of 4½ hours showed no change in heart rate, respiration or blood pressure, and necropsy revealed no gross pathological changes. In mice, treated with 1 gram per kilogram of body weight, daily, for two weeks, there were no changes in the red blood cells, hemoglobin, white cells or platelets.

The $LD_{50}$ of the N-dichloroacetyl methyl serinate when dissolved in water and administered intraperitoneally to mice has been found to be greater than 2000 mg./kg., whereas the $LD_{50}$ of N-dichloroacetyl ethyl serinate has been found to be greater than 1000 mg./kg.

Figures 2, 3:
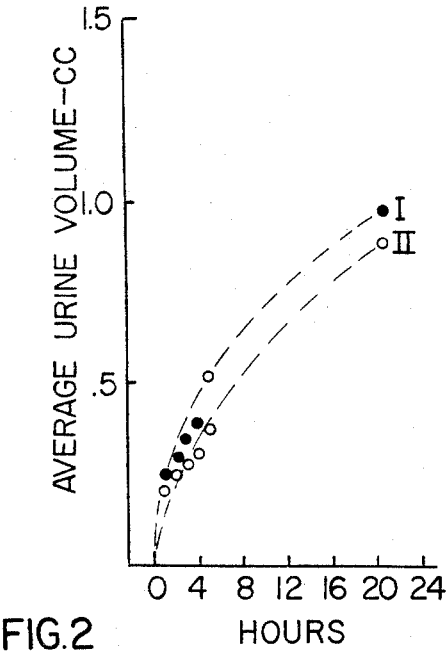

The sodium salt of N-dichloroacetyl-DL-serine in the antitumor dose used most frequently throughout this study (1 gram per kilogram of body weight) exerts a diuretic effect. This effect is illustrated in FIG. 2 and FIG. 3. Each group contained 6 mice (Connaught), which were caged individually in small metabolic cages and urine volumes were collected and estimated in small graduated flasks. FIG. 2 shows two groups, neither of which were treated. FIG. 3 shows the same two groups 24 hours later. Group II received one intraperitoneal injection of the sodium salt of N-dichloroacetyl-DL-serine (1 gram per kilogram of body weight). It can be seen that at the end of 22 hours, group II excreted an average of 1.25 cc. of urine compared to 0.85 cc. excreted by the control group. It should also be noted that most of the diuresis took place during the first 6 hours.

During treatment, nine patients exhibited a definite diuresis; in the others there was no increase in urinary excretion, or the diuresis was questionable. Those patients with diuresis also experienced thirst. Nineteen of the 21 cases developed an unexpected neuropathy at one time or another during the course of therapy. The time of onset of the symptoms varied. In some patients, neurological signs appeared as early as the second treatment day; in others, a month elapsed before the onset of symptoms.

Generally speaking the compounds which can be used in accordance with the present invention are prepared by selective acylation of the amino group of DL-serine, leaving the hydroxyl group untouched. More specifically, DL-serine is reacted with monochloroacetyl chloride, dichloroacetyl chloride or trichloroacetyl chloride in an alkaline medium and the alkali metal derivative is isolated from the reaction mixture.

The N-haloacetyl ester derivatives may be prepared directly from the serine methyl or ethyl ester by N-acylating with a haloacetyl chloride in the usual manner. For example, the methyl ester of N-dichloroacetyl-DL-serine was prepared by reacting a chloroform solution of DL-serine methyl ester with dichloroacetyl chloride in the presence of triethylamine. If desired the same product may be obtained by esterifying N-dichloroacetyl-DL-serine with diazomethane.

It will be appreciated by those skilled in the art that the chemical structure of serine (α-amino-β-hydroxy propionic acid) and its end product N-haloacetyl derivatives as well as their alkali metal salts contain an asymmetric carbon atom and are therefore capable of existing in two optically active forms known as enantiomers.

Because of the difficulty of representing these structural differences in graphic formulae, the customary structural formulae have been used in both the specification and the claims without distinction as to the particular structural and optical configurations of the compound. However, it should be expressly understood that while no notation has been used to make the distinction referred to above, the formulae used are to be interpreted in their generic sence, that is as representing D-, L-, or DL-serine, that is either the separate isomers or the optical racemates. Such a formula does not merely represent the unresolved mixture of isomers.

Examples

In order to illustrate the preparation of the new products of the present invention, reference is made to the following examples:

Example I.—Sodium salt of N-dichloroacetyl-DL-serine 21 gm. (0.2 mole) of DL-serine were dissolved in 100 cc. of 2-N-sodium hydroxide solution (0.2 mole sodium hydroxide) in a one-litre four-necked round-bottom flask, fitted with a thermometer, stirrer and two dropping funnels. The clear, colorless solution of the sodium salt of DL-serine was cooled in a salt-ice mixture to between −5° C. and 0° C. with strong stirring. There were then added 125 cc. 2-N-sodium hydroxide solution (0.25 mole sodium hydroxide) and 36.9 gm. dichloroacetyl chloride (0.25 mole) simultaneously, drop-wise, and at such a rate that the reaction mixture remained on the basic side throughout the addition and the temperature of the reaction mixture remained between −3° C. and 3° C.

During this addition, which required about one hour, a fine white crystalline precipitate fell out of solution. This product was removed by filtration, washed with a little ice cold water and dried at 50° C. in a vacuum oven. Melting point 172–176° C. The product after crystallization from water melted at 178–179° C. This product is the sodium salt of N-dichloroacetyl-DL-serine and has the following formula:

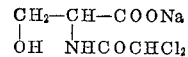

Calculated for $C_5H_6Cl_2NO_4Na$: C, 25.23; H, 2.54; N, 5.89%. Found: C, 25.09; H, 2.42; N, 5.75%.

Example II.—N-dichloroacetyl-DL-serine methyl ester (a) By esterification of N-dichloroacetyl-DL-serine with diazomethane.—N-dichloroacetyl-DL-serine (12.0 gm.) was covered with ether (100 ml.) in a 1-litre round-bottomed flask. An ether solution containing diazomethane (approximately 4.7 to 5.0 gm.) prepared from N-nitroso-N-methyl urea (17.7 gm.) was added cautiously and with stirring to this partially dissolved mixture. When the evolution of nitrogen subsided the clear yellow solution was allowed to stand in a fume hood overnight. It was then filtered from a small amount of extraneous material and glacial acetic acid (2 ml.) was added to destroy residual diazomethane. The residue obtained on removal of the ether yielded long white needles of N-dichloroacetyl-DL-serine methyl ester (7.2 gm., 56.7%), and an additional 3.2 gm. (25.2%) of crystalline product was recovered from the mother liquors. An analytical sample was recrystallized from ether-petroleum ether and dried over $P_2O_5$ at 60° C. for 8 hours, M.P. 82–83.5° C. It is soluble in water (20% at 27° C.) and in most common organic solvents.

Calculated for $C_6H_9Cl_2NO_4$: C, 31.32; H, 3.94; N, 6.09%. Found: C, 31.36; H, 3.85; N, 6.28%.

The infrared absorption curve of this product was identical with that of the same product synthesized by route b below.

(b) By N-dichloroacylation of DL-serine methyl ester.—Triethylamine (101 gm., 1.0 mole) was added to DL-serine methyl ester hydrochloride (155.6 gm., 1.0 mole) suspended in chloroform (1000 ml.). The liberated ester base and the triethylamine hydrochloride dissolved in the chloroform. The clear solution was cooled in a salt-ice bath to −5° C. Dichloroacetyl chloride (147.5 gm., 1.0 mole) and a second portion of triethylamine (101.0 gm., 1.0 mole) were then added simultaneously and dropwise over a period of 1½ hours so that the temperature in the reaction flask did not rise over 10° C. When the additions were completed the solution was stirred at room temperature for an additional half hour. It was then filtered from some extraneous material and the chloroform removed with vacuum from a water bath at 40–50° C. The residual oily solid was extracted with boiling anhydrous ether (4×100 ml.) whereby the product was separated from ether-insoluble triethylamine hydrochloride. The hot ether solution was filtered and on cooling deposited a voluminous mass of white feathery crystals (132.5 gm., 57% yield), M.P. 82–83° C.

Calculated for $C_6H_9Cl_2NO_4$: C, 31.32; H, 3.94; N, 6.09%. Found: C, 31.34; H, 3.98; N, 6.37%.

Example III.—N-dichloroacetyl-DL-serine ethyl ester

This compound was prepared from DL-serine ethyl ester hydrochloride (84.8 gm., 0.5 mole), triethylamine (101.0 gm., 1.0 mole), and dichloroacetyl chloride (73.7 gm., 0.5 mole) in chloroform solution following the procedure described above for the preparation of N-dichloroacetyl-DL-serine methyl ester. The colorless compound (65.7 gm., 53% theory) was recrystallized from diethyl ether, M.P. 75–76° C.

Calculated for $C_7H_{11}Cl_2NO_4$: C, 34.44; H, 4.54; N, 5.73%. Found: C, 34.41; H, 4.38; N, 5.75%.

Example IV.—N-monochloroacetyl-DL-serine

Employing the usual Schotten Baumann method, DL-serine (105 gm. 1 mole) dissolved in 313 ml. 4 N NaOH, was treated with chloroacetyl chloride (142 gm., 1.25 mole) while an additional 250 ml. of 4 N NaOH was simultaneously added. These additions were made while the temperature of the reaction mixture was kept below 5° C. The pH of the mixture was continually maintained on the alkaline side. As the final quantity of chloroacetyl chloride was being added it was found necessary to add an amount of 4 N NaOH equivalent to an additional ¼ mole. The mixture was stirred for ¾ hour after additions were complete.

Concentrated hydrochloric acid (125 ml.) was added, and the mixture evaporated to dryness yielding a residual mixture of oil and crystals. This was repeatedly extracted with 200 ml. portions of ethylacetate until no further oil was extractable. These extracts were combined, dried over anhydrous MgSO₄, filtered and evaporated. The residual oil was yellow-orange in color. Weight 110 gm. The oil was churned with 3×100 ml. portions of petroleum ether (30–60° C.), the petroleum ether decanted in each case, and the residual oil was again evaporated to dryness. It was taken up in 200 ml. ethyl acetate (tendency to crystallize in the cold), warmed, filtered, and after addition of petroleum ether (30–60° C.) to the filtrate, refrigerated. A second crystallization from acetone yielded the colorless crystalline product (40.4 grams) which melted at 122–123° C.

Example V.—N-trichloroacetyl-DL-serine sodium salt

DL-serine (210 gm., 2 moles) was dissolved in 4 N sodium hydroxide solution (500 ml.) in a 5-litre, four-necked round-bottomed flask fitted with a thermometer, motor-driven stirrer and two dropping funnels. The clear colorless solution of the sodium salt of DL-serine was cooled in an ice-salt mixture to −5° C. Trichloroacetyl chloride (440 gm.) and 4 N sodium hydroxide solution (1000 ml.) were then added dropwise and simultaneously from the two dropping funnels to the stirred, cooled solution at such a rate that the reaction mixture remained on the basic side throughout these additions and the temperature of the reaction mixture remained at 0°±4° C.; when the additions were completed the reaction mixture was stirred in the cold for an additional hour, then acidified with 220 ml. concentrated hydrochloric acid and evaporated to dryness under reduced pressure and from a water bath at 50–60° C. The oily N-trichloroacetyl-DL-serine was extracted from the residual mixture with hot ethyl acetate (3×300 ml.). The combined ethyl acetate extracts were again evaporated to dryness as above, the residual product was dissolved in water and converted to the sodium salt by treating with one equivalent of sodium bicarbonate. The residual N-trichloroacetyl-DL-serine sodium salt obtained upon evaporation of the aqueous solution was crystallized from ethanol. The white crystalline product melted at 192–193° C.

Calculated for $C_5H_5Cl_3NO_4Na$: C, 21.04; H, 1.85; N, 5.14%. Found: C, 21.96; H, 1.85; N, 5.32%.

Example VI.—N-trichloroacetyl-DL-serine methyl ester

N-trichloroacetyl-DL-serine methyl ester was prepared according to the procedure described for N-dichloroacetyl-DL-serine methyl ester. The product was a clear liquid $n_d^{25}$ 1.5025.

Calculated for $C_6H_8Cl_3NO_4$: C, 27.24; H, 3.05; N, 5.29%. Found: C, 27.36; H, 3.18; N, 5.10%.

We claim:
1. The sodium salt of N-dichloroacetyl-DL-serine.

References Cited

Abe et al., "Antitumor Effect of Amino Acid Analogs," Yakugaku Zasshi 80, pp. 1309–1311 (1960); abstracted in Chem. Abstracts 55, 2900i, Feb. 1961.

Blondal et al., "Antitumor Effect of N-Dichloroacetyl-DL-Serine (FT–9045)," Radiology 76, pp. 945–960 (1961); abstracted in Chem. Abstracts 55, 20181F, Oct. 2, 1961.

Chem. Abstracts, 50, 305b (1956).
Chem. Abstracts, 52, 6304b (1958).
Chem. Abstracts, 53, 14015g (1959).
Greenberg et al., Science 271–272, 1947.

Levi et al., "N-Dichloroacetyl Derivatives of Serine and Threonine and Their Esters and Sodium Salts," Canad. J. Chem. 38, pp. 1135–1140 (1960); abstracted in Chem. Abstracts 54, 15713f, Aug. 10, 1960.

Levi et al., "Reversible N,O Haloacyl Shift in Serine Derivatives With Antitumor Activity," Canad. J. Chem. 39, pp. 2491–2501 (1961), abstracted in Chem. Abstracts 56, 10269e (1962).

Rao et al., J. Biol. Chem. 198, 507–523, 1952.

Stock et al., Cancer Research, June 1960, No. 5, vol. 20, pp. 193–202 and 229.

Tarnowski, Cancer Research, September 1958, pp. 1–9 and 136–145.

Wooley, "A Study of Antimetabolites," pp. 55 and 140–143. Published by John Wiley & Sons Inc., 1952.

LEWIS GOTTS, Primary Examiner.

S. K. ROSE, Assistant Examiner.

U.S. Cl. X.R.

260—482; 424—319